UNITED STATES PATENT OFFICE.

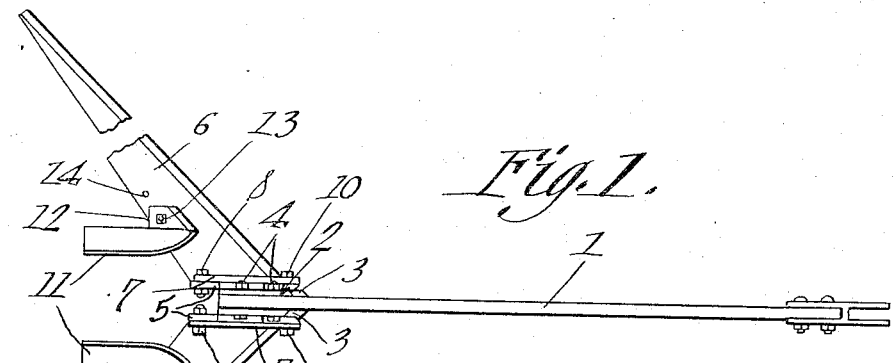
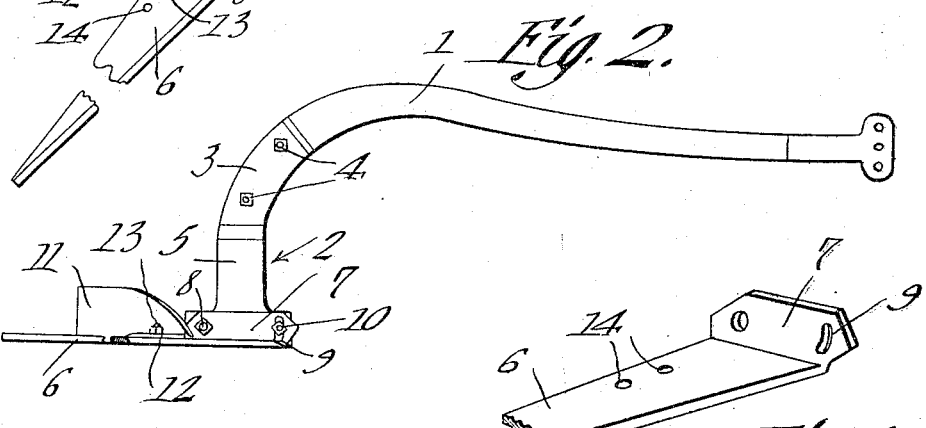
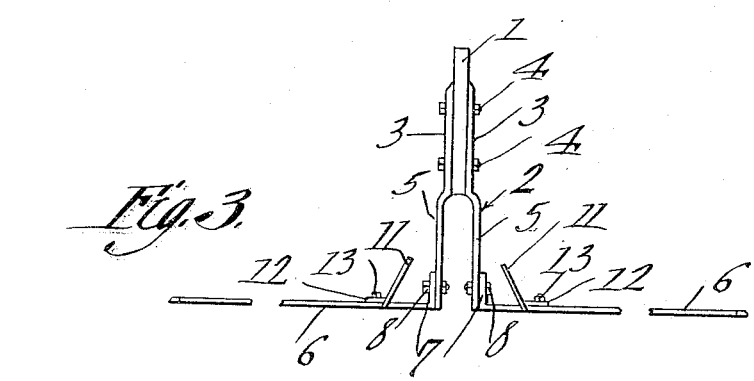

SILAS A. BILLINGTON, OF HAVENER, NEW MEXICO.

WEED-CUTTER.

1,205,967.

Specification of Letters Patent.

Patented Nov. 28, 1916.

Application filed February 8, 1916. Serial No. 76,982.

*To all whom it may concern:*

Be it known that I, SILAS A. BILLINGTON, a citizen of the United States, residing at Havener, in the county of Curry and State of New Mexico, have invented a new and useful Weed-Cutter, of which the following is a specification.

The present invention appertains to weed cutters, and aims to provide a novel and improved weed cutting attachment for listers or which can be attached to the beams of various plows.

It is the object of the invention to provide a weed cutting device of unique construction, and embodying blades adapted to work properly under the surface of the soil for loosening the weeds, means being provided whereby the blades may be adjusted relative to the beam in order that they may be made to operate properly under various conditions.

Another object is the provision in a weed cutting device, of novel means assembled with the weed cutting blades for deflecting the soil.

It is also within the scope of the invention to provide a weed cutting device having the features above noted, and which is comparatively simple and inexpensive in construction, as well as being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a plan view of the improved weed cutter, portions being broken away. Fig. 2 is a side elevation thereof, portions being broken away. Fig. 3 is a rear view, portions being broken away. Fig. 4 is a fragmental perspective view of one of the cutting blades.

The present attachment is applied to the beam 1 of a lister or other plow, and to this end a depending fork 2 is attached to and carried by the rear downturned end of the beam 1. This fork 2 comprises a pair of bars 3 having their upper ends secured to the sides of the beam 1 by means of bolts 4, and the lower or free portions of the bars 3 are offset away from each other, as at 5, to provide the branches or arms of the fork.

A pair of rearwardly diverging blades 6 are carried by the fork 2, the blades 6 being tapered from their adjacent or butt ends to their remote or free ends, and having their forward edges sharpened. The adjacent or butt ends of the blades 6 are provided with upturned flanges 7 resting against the remote or outer sides of the arms or portions 5 of the fork 2 at the lower or free ends of the said arms 5, and the flanges 7 are pivoted adjacent their rear ends to the arms 5, by means of bolts or other pivot members 8. The flanges 7 are provided adjacent their forward ends with arcuate slots 9 through which bolts or similar elements 10 are engaged, the bolts or elements 10 being secured to or carried by the arms 5. Thus when the bolts or clamping elements 10 are loosened, the flanges 7 may be swung vertically upon the outer sides of the arms 5 for adjusting the blades 6 properly about the axes of the bolts or pivots 8, and when the bolts 10 are tightened, the blades 6 will be held firmly in position relative to the fork 2 and beam 1.

A pair of inwardly inclined deflectors 11 are carried by the blades 6 adjacent their inner or butt ends, the deflectors 11 having outturned ears 12 at their lower edges and adjacent their forward ends, and which ears rest or bear upon the blades 6. Bolts or other pivot and clamping elements 13 are engaged through the ears 12 and blades 6, to secure the deflectors to the blades, the blades being provided with a plurality of apertures 14 for receiving the bolts 13, whereby the deflectors may be adjusted to various positions longitudinally of the blades. When the bolts 13 are loosened, the deflectors may be swung to various angles relative to the blades 6, and when the bolts 13 are tightened, the deflectors will be rigidly held in position relative to the blades.

In operation, when the parts are properly adjusted, the blades 6 are adapted to work under the surface of the soil at the opposite sides of the beam 1, for loosening the superficial portion of the soil and roots of the weeds, whereby the weeds may be destroyed. The deflectors 11 may be adjusted to project angularly toward or away from the longitudinal median line of the device, for either deflecting the soil inwardly or outwardly, whichever is desired.

The present contrivance is thoroughly practical and convenient in use, and the blades 6 and deflectors 11 may be readily formed from sheet metal or other suitable stock and at a comparatively small expense. The device may be attached to various plow beams, and a lister or other plow may be attached to the fork 2 in the same manner that the same is attached to an ordinary plow standard. If a plow is attached to the fork 2, the weed blades 6 will diverge rearwardly from the plow, as will be apparent, in order that the weeds at the opposite sides of the furrow will be loosened.

From the foregoing, the advantages and capabilities of the present invention are believed to be obvious to those versed in the art, and further comment is not deemed necessary.

Having thus described the invention, what is claimed as new is:—

A weed cutter embodying a supporting member, a pair of rearwardly diverging blades having their adjacent ends attached to said supporting member, and a pair of deflectors having their forward ends pivoted upon said blades, said deflectors projecting rearwardly from the blades and being inclined toward one another.

In testimony that I claim the foregoing as my own, I have hereto affixed my signature in the presence of two witnesses.

SILAS A. BILLINGTON.

Witnesses:
GEORGE H. VAN STONE,
REID H. PARKER.

Copies of this patent may be obtained for five cents each, by addressing the "Commissioner of Patents, Washington, D C."